May 26, 1936.    J. W. LOGAN, JR    2,042,111
BRAKE CIRCUIT CHECKING DEVICE
Filed March 28, 1934
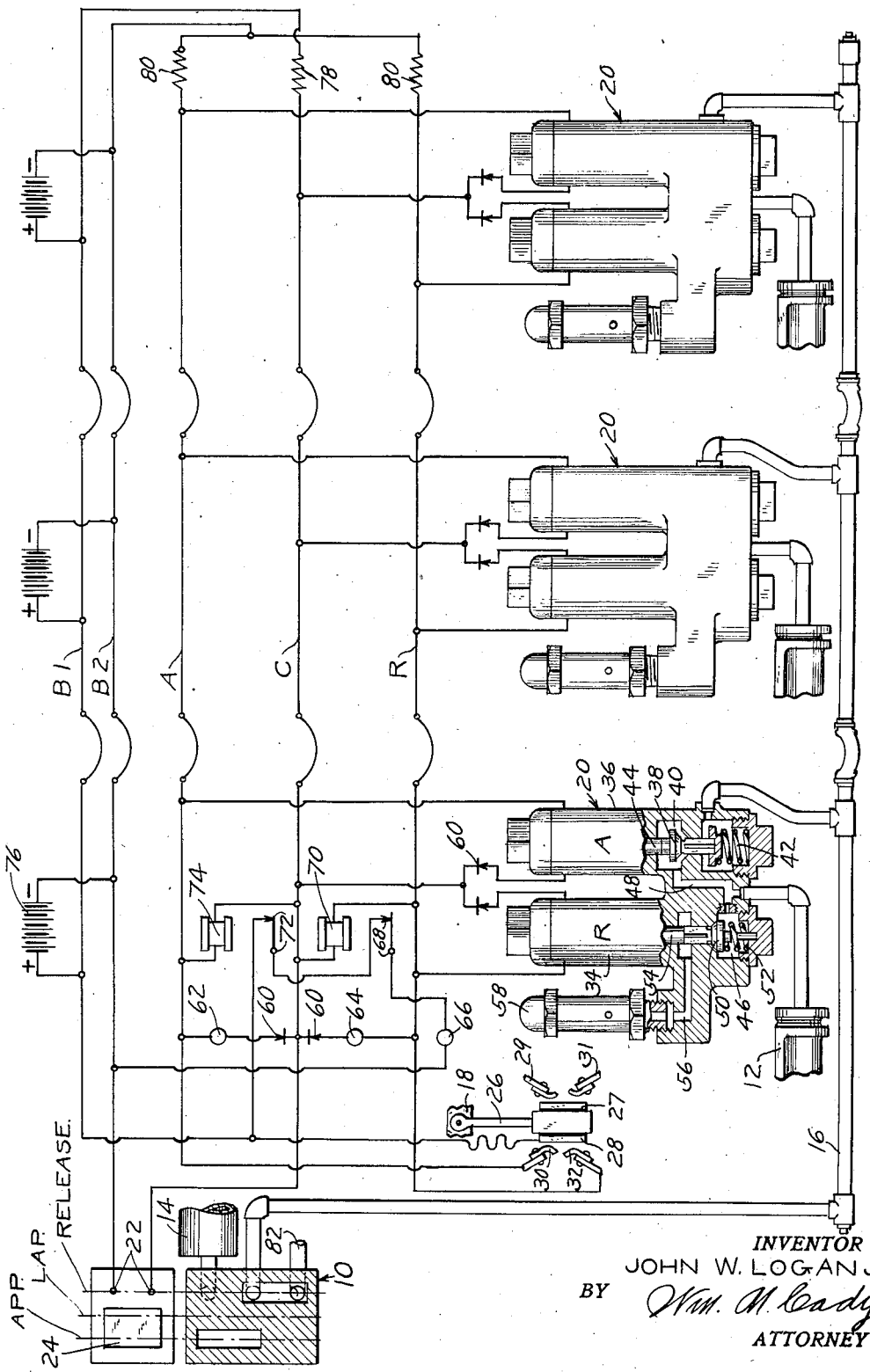
INVENTOR
JOHN W. LOGAN JR.
BY Wm. M. Cady
ATTORNEY Patented May 26, 1936

2,042,111

UNITED STATES PATENT OFFICE 2,042,111

BRAKE CIRCUIT CHECKING DEVICE

John W. Logan, Jr., Wilkinsburg, Pa., assignor to The Westinghouse Air Brake Company, Wilmerding, Pa., a corporation of Pennsylvania Application March 28, 1934, Serial No. 717,746

13 Claims. (Cl. 303—20)

This invention relates to brake circuit checking devices, and more specifically to checking devices for brake circuits on traction vehicles and railway trains.

In brake systems employing electrical circuits as part of the control apparatus, as for example, in electro-pneumatic brake systems, it is highly desirable that means be provided for checking the integrity of the principal circuits forming part of the control apparatus. It is, therefore, a principal object of my invention to provide means for indicating the integrity of main control circuits.

Another object of my invention is to provide an apparatus which is adapted to inform an operator as to whether or not certain principal devices in a brake system have functioned.

A still further object of the invention is to provide a brake equipment embodying the aforementioned checking features.

Still further objects and advantages of the invention will be apparent from the following description, which has been illustrated in connection with a simple fluid pressure brake system for a railway train, the embodiment being depicted in the single figure of the attached drawing.

This embodiment has been illustrated in connection with a train having three cars, each car of which is provided with brake control valve devices, but it will be apparent that any other number of cars, or other arrangements of apparatus, may be employed.

In order to simplify the description of the invention, I have shown it as applied to a simple brake system of the straight air type, the essential elements of which include a brake valve device, diagrammatically indicated at 10, for controlling the supply of fluid under pressure to and its release from brake cylinders 12, from a reservoir 14, by way of pipe 16.

The brake equipment may also include a retardation controller device 18 and a plurality of magnet valve devices 20, which cooperate to limit the maximum rate of retardation which may be produced by application of the brakes.

The brake valve device 10 may be of any of the usual types, as for example, a rotary type having the usual release, lap and application positions, the diagrammatic representation in the drawing indicating the connections formed when the rotary valve of this device is moved to the different positions provided for.

The brake valve device may also be provided with contacts 22, which are adapted to be bridged by a segment 24 when the brake valve handle is in lap or application position, and which are adapted to be unbridged when the brake valve handle is in release position.

The retardation controller device 18 may be of one of a large number of types, and I have indicated a pendulum type comprising a pendulum 26 carrying a contact 28 insulated therefrom and adapted to engage, successively, resilient and yielding stationary contacts 30 and 32.

While the embodiment shown in the drawing provides for control of the brakes from one end of the train only, an additional brake valve device may be provided at the other end of the train so that the brakes may be controlled from either end. When double end control is provided for, additional contacts 29 and 31 may be added to the retardation controller device 18, and arranged to contact with another contact 27 carried by the pendulum 26, so as to provide for functioning of the retardation controller for either direction of travel of the train.

As will be more obvious later, contacts 29 and 30, as well as contacts 31 and 32, may be connected together, and contact 27 may be connected to contact 28. If desired, a reversing switch means may then be employed to cut in either the contacts to the left or right of the pendulum 26, depending upon the direction of travel of the train, although this is not wholly necessary.

Each magnet valve device 20 comprises a release valve section 34 and an application valve section 36. The application valve section 36 is provided with an application valve 38 disposed in an application valve chamber 40 and urged toward unseated position by a spring 42. The application valve 38 is urged toward seated position by an electromagnet in the upper part of the casing embodying the valve section, which when energized actuates a stem 44 downwardly to seat the valve.

When the application valve 38 is in unseated position, fluid under pressure may flow from the pipe 16 to the connected brake cylinder 12, and when the valve is in seated position, this flow is cut off.

The application valve chamber 40 is in communication with a release valve chamber 46 in the release valve section 34, by way of a passage 48. Disposed in the release valve chamber 46 is a release valve 50, which is urged toward seated position by a spring 52, and toward unseated position by action of an electromagnet in the upper part of the valve device casing, which when energized actuates a stem 54 downwardly to unseat the valve.

When the release valve 50 is in unseated position, fluid pressure in the connected brake cylinder 12 may be released to the atmosphere by way of passage 56 and a safety valve device 58. When the release valve 50 is in seated position, this release of fluid pressure from the connected brake cylinder is cut off.

The safety valve device 58 is preferably of one of the well known types, the function of which, as is well known in the art, is to limit the pressure which may be released from the brake cylinder.

The electromagnets of each magnet valve device 20 are normally deenergized, and during an application of the brakes are adapted to be energized by operation of the retardation controller device 18. The contact 30 of the retardation controller device is connected to a conductor A, which extends throughout the train and connects with one terminal of each of the electromagnets controlling operation of the application valves 38. The contact 32 of the retardation controller device is similarly connected to each electromagnet controlling operation of the release valves 50, by a conductor R, which also extends throughout the train.

The other terminal of each electromagnet is connected to a third conductor C, which also extends throughout the train and forms a common connection therefor. Between each electromagnet and the common conductor C, there is interposed a directional device 60, the function of which is to oppose the flow of current in one direction but to permit flow in the opposite direction. This device may be of any suitable type, as for example, the type commonly referred to as the copper oxide rectifier type.

The retardation controller device 18 is positioned on the head end car in the train in a manner such that when the train is decelerating from motion to the left, the pendulum 26 swings to the left, and when decelerating from motion to the right the pendulum swings to the right, the degree of swing depending upon the rate of retardation. When the pendulum has swung far enough for its contact 28 to engage the first stationary contact 30, the right hand electromagnet in each magnet valve device 20 is energized to seat the application valve 38.

When the pendulum 26 has swung far enough for contact 28 to engage contact 32, the left hand electromagnet in each magnet valve device 20 is energized to unseat the release valve 50. The retardation controller device may, therefore, be adjusted to cut off the supply of fluid under pressure to the brake cylinders at a definite rate of retardation and to release fluid pressure therefrom at another definite rate of retardation.

For providing visual means for indicating to the operator the integrity of the circuits between the retardation controller device and the magnet valve devices throughout the train, and for indicating when these devices are operated, there is provided indicating lamps, or similar visual means, 62, 64 and 66. The lamp 62 is connected between conductors A and C through another directional device 60, while lamp 64 is connected between conductors R and C through a similar directional device 60.

Lamp 66 is connected across supply conductors B1 and B2, which also extend throughout the train, through contacts 68 of a relay 70, and contacts 72 of a similar relay 74. The relay 70 is connected between conductors R and C, while relay 74 is connected between conductors A and C.

The supply conductors B1 and B2 are connected to a source of current supply, such for example as batteries 76, and are adapted to supply current to the valve device circuits heretofore described at either the front end of the train or at the rear end of the train. As connected in the drawing, conductor B1 will be of positive polarity and conductor B2 of negative polarity.

At the rear end of the train the positive supply conductor B1 is connected to the common conductor C through a resistance device 78, and the negative supply conductor B2 is connected to each of conductors A and R through resistance devices 80. The purpose of this arrangement will appear presently.

In operation, when the train is running the operator maintains the handle of the brake valve device 10 in release position, whereupon a port in the rotary valve connects the pipe 16 to another pipe 82 leading to the atmosphere, and the rotary valve blanks off the connection with the reservoir 14.

The pendulum 26 of the retardation controller device will be in a position such that its contact 28 is out of engagement with the stationary contacts 30 and 32, so that the electromagnets in each magnet valve device 20 will be deenergized. The brake cylinders are, therefore, in communication with the atmosphere, and the brakes are thus held in release position.

In release position, the contacts 22 in the brake valve device are not bridged by the segment 24, so that the common conductor C is not in electrical connection with the negative supply conductor B2. However, at the rear of the train the conductor C is in electrical connection with the positive supply conductor B1 through the resistance device 78.

A circuit is thus completed from the positive supply conductor B1, through the resistance device 78, to each of relays 70 and 74, the return path for the relay 70 being by way of conductor R and the lower resistance device 80 to the negative supply conductor B2, and the return path for the relay 74 being by way of the conductor A and the upper resistance device 80 to the negative supply conductor B2. Relays 70 and 74 will thus be maintained energized, and contacts 68 and 72, respectively, will be held closed.

As will be seen from the circuits shown, indicating lamp 66 will then be connected to the supply conductors B1 and B2 and will, therefore, be lighted.

If either of relays 74 or 70 should fail to be energized, indicating lamp 66 would not be lighted, and the operator would then be aware that some fault exists in the circuits. However, when the lamp is lighted it serves as an indication that the circuits contain no faults, such as open circuits or crossed wires.

If the main circuit should contain a fault, as for example, should either of conductors A, C or R be broken, then one or both of relays 70 and 74 will be deenergized, and indicating lamp 66 will not be lighted. Similarly, should conductor A be short-circuited with conductor C, or should conductor R be short-circuited with conductor C, then relay 74, or relay 70, would be deenergized and indicating lamp 66 would not be lighted. Being thus warned that a fault exists in the main circuits to the electromagnets in the magnet valve devices, the operator may control applications of the brakes accordingly.

If the indicating lamp 66 is lighted and it is desired to effect an application of the brakes as for normal operation, the operator moves the handle of the brake valve device to application position. In this position the rotary valve of the brake valve device disconnects pipe 16 from communication with the atmosphere, and reconnects the pipe with the reservoir 14. Fluid under pressure then flows from the reservoir through pipe 16 to the brake cylinders 12, by way of the magnet valve devices 20. If the operator wishes to lap the supply to the brake cylinders, he moves the handle of the brake valve device to lap position.

When the brakes are applied and the train begins to decelerate, the pendulum 26 of the retardation controller device swings to the left. If the pendulum swings far enough for its movable contact 28 to engage the stationary contact 30, then the right hand electromagnet in each magnet valve device 20 will be energized, and as a consequence the application valves 38 will be seated. Seating of these valves cuts off the supply of fluid to the brake cylinders, unless the supply has already been cut off by movement of the brake valve handle to lap position.

If movement of the pendulum 26 is far enough to the left for its contact 28 to engage the stationary contact 32, then the left hand electromagnet in each magnet valve device 20 will be energized, whereupon each release valve will be unseated. Unseating of these release valves releases fluid pressure from the brake cylinders to the atmosphere, by way of the safety valve device 58, the safety valve device functioning to retain a predetermined pressure in the brake cylinders, according to the setting of the safety valve device.

With the release of fluid pressure from the brake cylinders, the rate of retardation will diminish, and the pendulum 26 will swing to the right. When contact 28 is disengaged from contact 32, the left hand electromagnet in each magnet valve device will be deenergized, and the release valve 50 will be seated. Seating of these valves cuts off further release of fluid pressure from the brake cylinders.

If more pressure has been released from the brake cylinders than is necessary, so that the pendulum 26 swings far enough to the right to disengage contact 28 from contact 30, the right hand electromagnet in each magnet valve device will be deenergized, whereupon the application valve 38 will be unseated to permit fluid under pressure to again flow to the brake cylinders. It will therefore be obvious that the pendulum 26 will swing back and forth to control the fluid pressure established in the brake cylinders to limit the rate of retardation to a value for which the retardation controller has been set.

When the brake valve handle is moved to either application or lap position, the segment 24 bridges the contacts 22, thereby connecting the conductor C to the negative supply conductor B2. This reverses the polarity of that portion of conductor C to the left of the resistance device 78, so that relays 70 and 74 are deenergized, whereupon contacts 68 and 72 are opened.

Opening of these contacts interrupts the circuit to indicating lamp 66, which then shows dark. The operator is thus informed that normal conditions obtain in the circuits to the magnet valve devices. If the lamp 66 should continue to be lighted, it is an indication of the existence of a fault in the circuits.

When the contact 28 of the retardation controller device has engaged the contact 30, conductor A is connected to positive supply conductor B1 at the head end of the train, and indicating lamp 62 is lighted. This lamp could not be previously lighted from the rear end of the train because a directional device 60 prevents the flow of current from the conductor C toward the conductor A, which direction would be necessary before the retardation controller functions, due to the C conductor being connected to the positive supply conductor B1 at the rear end of the train.

When the contact 28 of the retardation controller has engaged contact 32, conductor R is connected to the positive supply conductor B1 at the head end of the train, and indicating lamp 64 is lighted. This lamp could not previously be lighted because, as before, a directional device 60 prevents current flow from the conductor C toward the conductor R.

As the retardation controller device causes contact 28 to disengage from contacts 32 and 30, the indicating lamps 64 and 62 are darkened. These lamps therefore serve to indicate when the retardation controller device has operated its contacts and, if no faults exist in the circuits, also when the magnet valve devices have been operated.

If some fault should occur in the retardation controller device, so that it is not operable to effect engagement of the aforementioned contacts, and the rate of retardation has reached a known high value at which the retardation controller would normally function, the operator is then aware of the inoperativeness of the retardation controller and may control the fluid pressure in the brake cylinders by manipulation of the brake valve handle.

Faulty operation of the electromagnets in each magnet valve device is prevented by the directional devices 60 connected in the circuit to each. These devices prevent the flow of current from the conductor C toward either the conductor A or the conductor R. The electromagnets can be energized, therefore, only by operation of the retardation controller device.

It will thus be seen that my invention provides for the indication of the integrity of the main circuits in a brake system, as well as for indicating whether or not certain devices are functioning, so that the operator may know at all times whether or not the circuits are in a condition to provide for the normal functioning of the apparatus, and whether the apparatus has functioned properly.

While the embodiment illustrated shows only one adaptation of my invention, it is to be understood that I do not intend to be limited to this embodiment alone, or otherwise than by the spirit and scope of the appended claims.

Having now described my invention, what I claim as new and desire to secure by Letters Patent, is:

1. In a railway train brake system, the combination with a plurality of electro-pneumatic control valve devices, of a retardation controller device for controlling operation of said valve devices, a circuit connecting said retardation controller device with said valve devices, and means for indicating at all times whether or not said retardation controller device has operated to effect operation of said valve devices.

2. In a railway train brake system, the combination with plurality of magnet valve devices, of a retardation controller device having normally open contacts, said contacts being adapted to control operation of said valve devices, a circuit connecting said contacts with said valve devices, and means for indicating when said contacts are closed.

3. In a railway brake system, the combination with a plurality of electro-pneumatic brake control valve devices, means for effecting operation of said valve devices, circuits connecting said means with said devices, indicating means including relays connected with said circuit for indicating the integrity of said circuit and operation of said valve devices, and means whereby said relays are energized for normal conditions of said circuit and at least one of said relays is deenergized for fault conditions of said circuit.

4. In a railway train brake system, the combination with electro-pneumatically controlled valve devices, of a retardation controller device for controlling operation of said valve devices, circuits extending throughout the train and adapted to connect said retardation controller device with said valve devices, means for supplying current of one polarity to said circuits at one point and of another polarity at another point, and indicating means adapted to give one indication when current of one polarity is supplied to said circuit at one point and to give another indication when current of another polarity is supplied to said circuit at another point.

5. In a railway train brake system, the combination with a brake cylinder, of a magnet valve device for controlling the supply of fluid under pressure to and its release from said brake cylinder, a retardation controller device for controlling said valve device, a circuit connecting said retardation controller device with said magnet valve device, means including a relay connected in said circuit for indicating the integrity of said circuit, and means whereby said relay is energized for a normal condition of said circuit and deenergized for an abnormal condition of said circuit.

6. In a railway train brake system, the combination with a brake cylinder, of a magnet valve device for controlling the supply of fluid under pressure to and its release from said cylinder, a retardation controller device for controlling operation of said magnet valve device, circuits connecting said retardation controller device with said magnet valve device, means for indicating the condition of said circuits, and means for indicating when said retardation controller device has operated.

7. In a railway train brake system, the combination with a magnet valve device, of a control device for controlling operation of said valve device, a circuit connecting said control device with said valve device, means for supplying current of one polarity to said circuit at one point, means for preventing said current from operating said valve device, means controlled by said control device for supplying current of opposite polarity to said circuit at another point to operate said valve device, and indicating means for indicating when current has been supplied to operate said valve device.

8. In a railway train brake system, the combination with a plurality of electromagnetically operated valve devices, of control means for controlling operation of said valve devices, circuits connecting said means with said valve devices, indicating means including relays connected in said circuits, means for supplying current to said circuits to operate said relays, means preventing said current supplied to operate said relays from operating said valve devices, and means controlled by said control means for supplying current to operate said valve devices.

9. In a railway train brake system, the combination with a brake cylinder, of a brake valve device for controlling the supply of fluid under pressure to and its release from said brake cylinder, electro-pneumatic valve means for also controlling the supply of fluid under pressure to and its release from said brake cylinder, a retardation controller device for controlling said electro-pneumatic valve means, a circuit connecting said retardation controller device with said valve means, means for indicating faults in said circuit, and means for indicating when said retardation controller device has operated.

10. In a railway train brake system, in combination, two supply conductors and a return conductor all of which are adapted to extend throughout the train, three resistance devices, a source of direct current supply, means for connecting the end of each of said supply conductors at the rear end of the train to a terminal of said source of one polarity and in series with one of said resistance devices, means for connecting the end of said return conductor at the rear end of the train to a terminal of said source of opposite polarity and in series with another of said resistance devices, a first relay connected between one supply conductor and the return conductor at the head end of the train, a second relay connected between the other supply conductor and the return conductor at the head end of the train, said relays being adapted to be energized when said conductors are connected to said source as aforesaid, indicating means for indicating when said relays are energized, and manually operated means for connecting the end of said return conductor at the head end of the train to the terminal of said source of a polarity opposite to that connected to the return conductor at the rear end of the train, whereby said relays are deenergized.

11. In a railway train brake system, in combination, a brake cylinder, valve means having an application electromagnet and a release electromagnet for controlling the supply of fluid under pressure to and its release from said brake cylinder, an application conductor for supplying current to said application electromagnet, a release conductor for supplying current to said release electromagnet, a return conductor for forming a return path for the current supplied to both of said electomagnets, a source of direct current supply, means for connecting one end of said application conductor and one end of said release conductor to a terminal of said source of one polarity, means for connecting one end of said return conductor to a terminal of said source of opposite polarity, resistance means connected between said conductors and said source, means for preventing energization of said electromagnets when said conductors are connected as aforesaid, indicating means connected to the other end of said three conductors and operable to produce one indication when said conductors are intact and connected as aforesaid and operable to produce another indication when faults exist in said conductors when connected as aforesaid, manually operated means for connecting the free end of said return conductor to a terminal of said source of polarity opposite to that connected to the other end of said return conductor, said indicating means being responsive to said last mentioned connection to produce said other indication, and means operated according to the rate of retardation of the train for connecting the free ends of said application and release conductors to a terminal of said source of polarity opposite to that connected to the other ends of said application and release conductors to supply current to said electromagnets.

12. In a train braking system, in combination, three conductors adapted to extend throughout the train, a source of direct current, means for connecting a terminal of said source of one polarity to the end of one of said three conductors at the rear end of the train through a resistance, means for connecting a terminal of said source of opposite polarity to the two ends of the other two of said three conductors at the rear end of the train through other resistance, means including a manually operable device for effecting an application of the brakes, means operable when said manually operable device is in brake applying position for connecting said second mentioned terminal of said source to the end of said first conductor at the head end of the train, means responsive to a chosen rate of retardation of the train for connecting said first mentioned terminal of said source to the end of one of said other two wires at the head end of the train and responsive to a higher rate of retardation of the train for connecting said first mentioned terminal of said source to the other of said two conductors at the head end of the train, a brake application controlling magnet valve device connected between said first conductor and one of said other two conductors, an electric valve device in said connection operable to pass current when supplied to said conductors at the head end of the train only, a brake release controlling magnet valve device connected between said first conductor and the other of said two conductors, a second electric valve device in said connection operable to pass current supplied to said conductors at the head end of the train only, a relay connected between said first conductor and one of said other two conductors, a relay connected between said first conductor and the other of said two conductors, said relays being energized when said three conductors are connected to said source at the rear end of the train and deenergized when so connected at the head end of the train, and indicating means effective only when both of said relays are energized.

13. In a train braking system, in combination, two wires extending throughout the train, a source of direct current having its first terminal connected with the first of said wires through a resistance at one end of the train and having its second terminal connected with the second of said wires through a resistance at the same end of the train, means including a manually operable device for effecting an application of the brakes, means operable when said device is in brake applying position to connect the second terminal of the source with said first wire at the other end of the train, means responsive to a given rate of retardation of the train for connecting said first mentioned terminal of said source with the second of said wires at said other end of the train, a brake application controlling magnet connected across said wires through an electric valve device operable to conduct current supplied to the wires at said other end of the train, a relay connected across said wires at said other end of the train, and indicating means controlled by said relay.

JOHN W. LOGAN, Jr.